Aug. 30, 1966 B. G. DANIELS ETAL 3,269,514
APPARATUS FOR FEEDING CLOSURE CAPS
Filed May 7, 1964 6 Sheets-Sheet 3
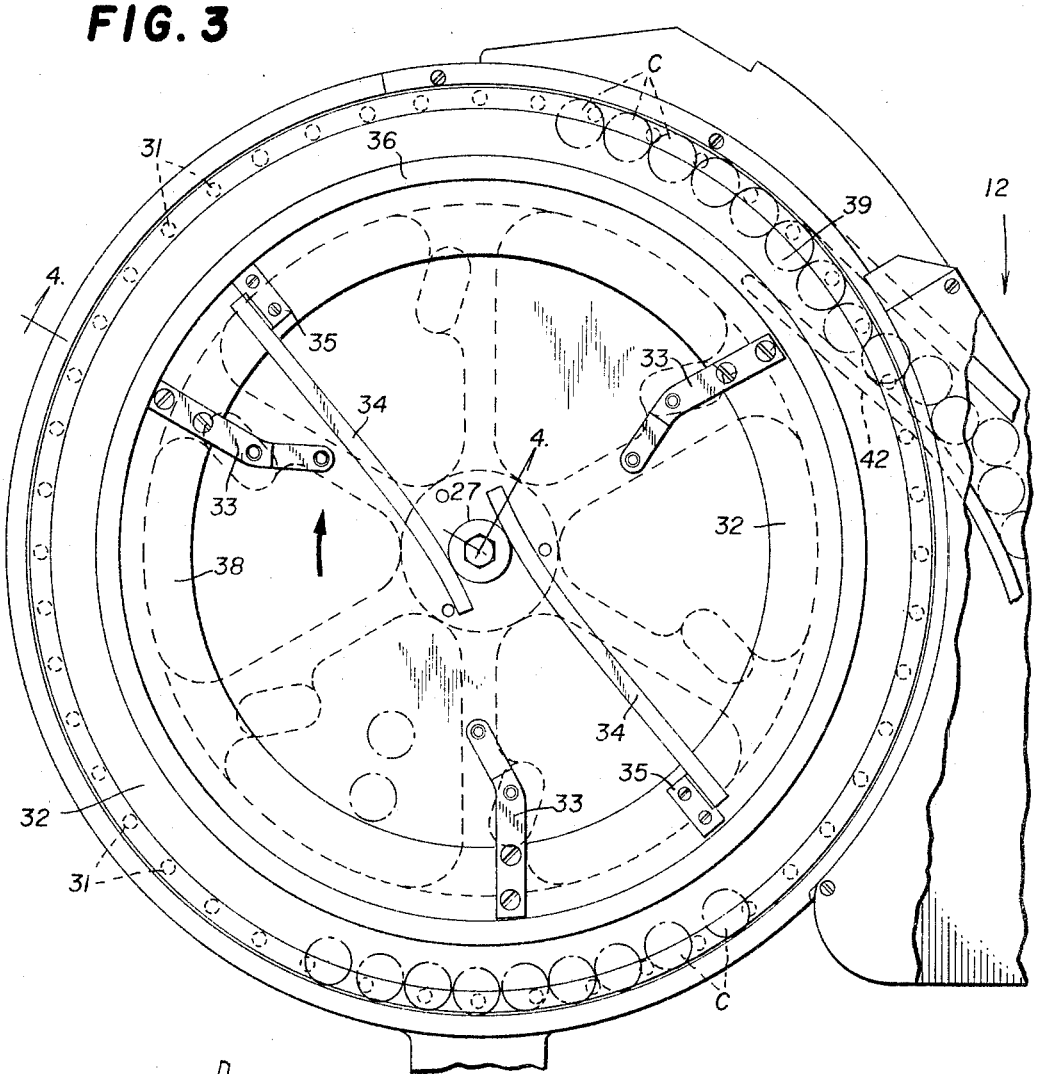
FIG. 3
FIG. 4
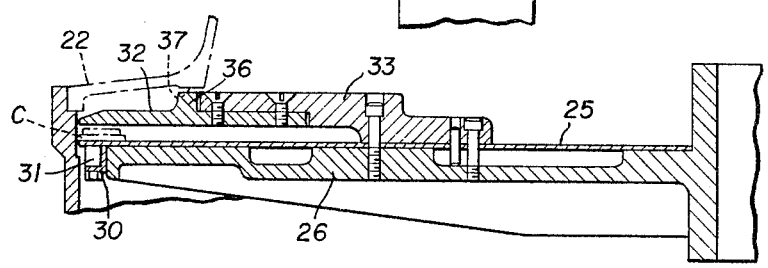
INVENTORS
BEN G. DANIELS
HELMUTH E. RAATZ, JR.
BY
ATTYS.

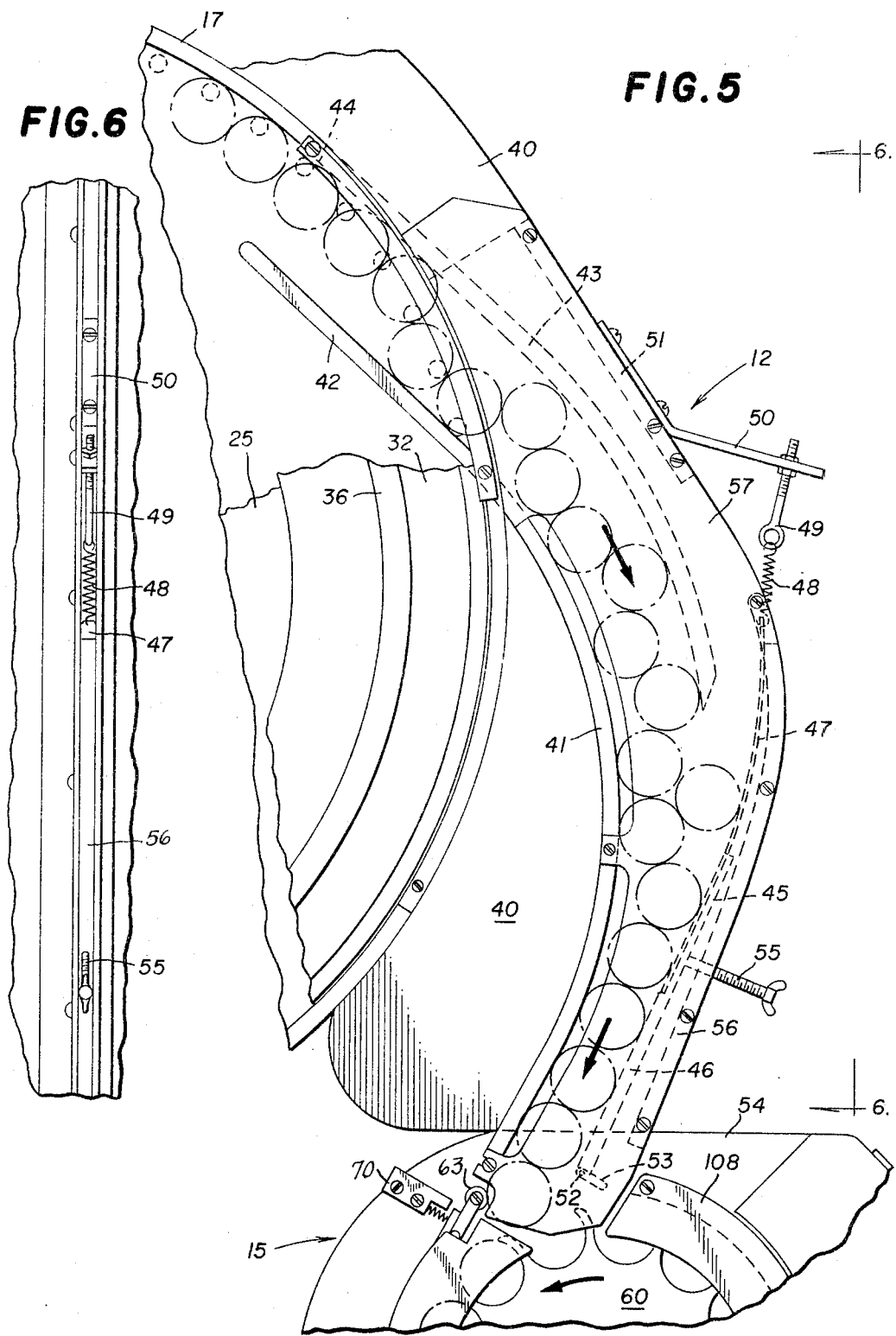

Aug. 30, 1966   B. G. DANIELS ETAL   3,269,514
APPARATUS FOR FEEDING CLOSURE CAPS
Filed May 7, 1964   6 Sheets-Sheet 5
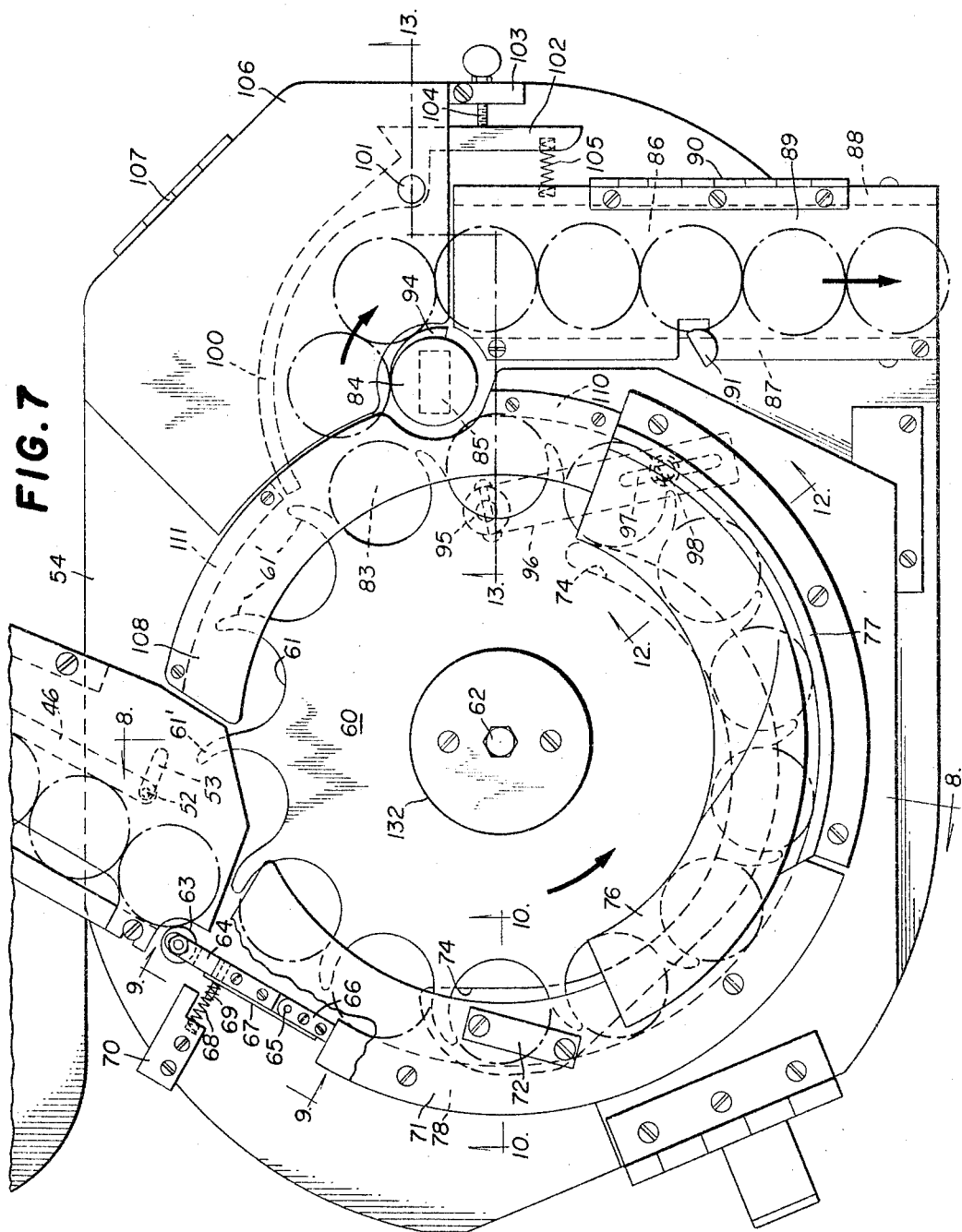
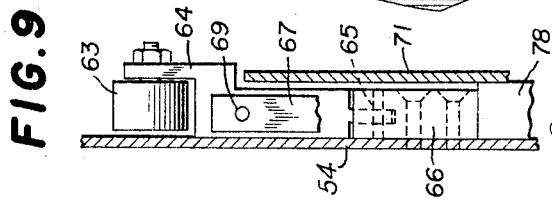
INVENTORS
BEN G. DANIELS
HELMUTH E. RAATZ, JR.
ATTYS.

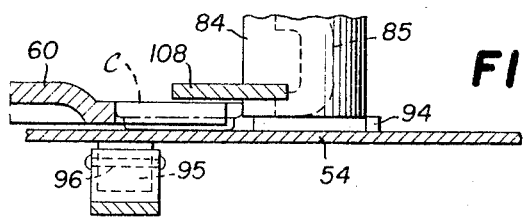
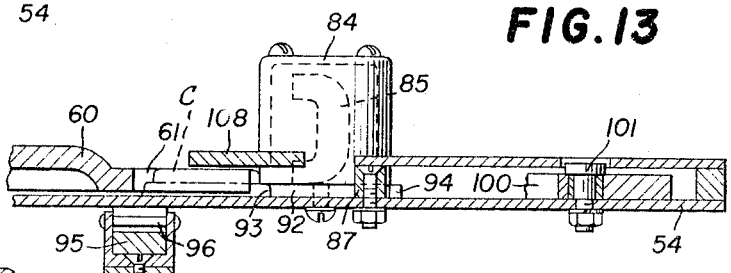
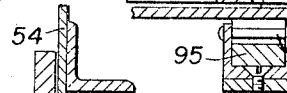
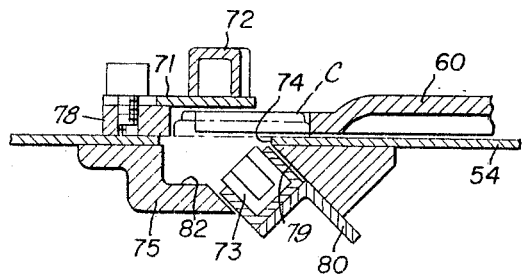
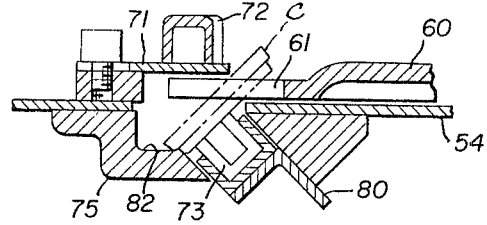
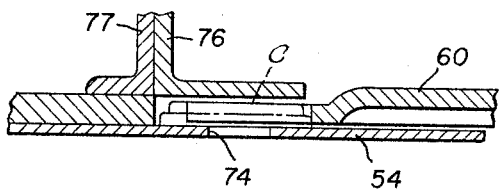
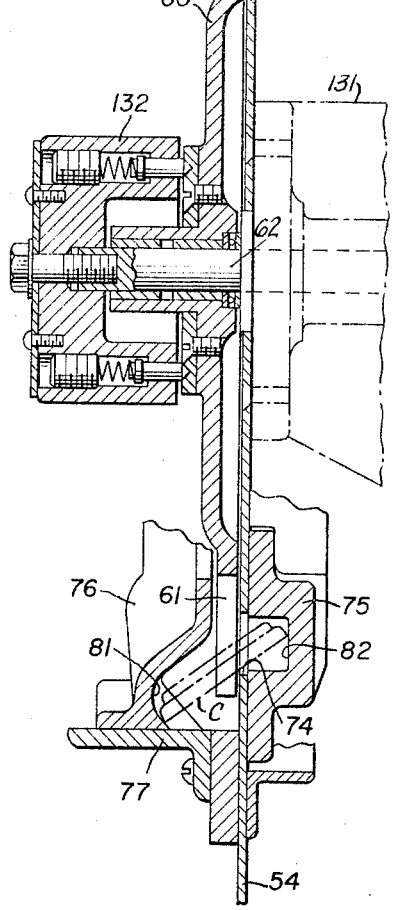

United States Patent Office 3,269,514
Patented August 30, 1966

3,269,514
APPARATUS FOR FEEDING CLOSURE CAPS
Ben G. Daniels, Elmhurst, and Helmuth E. Raatz, Jr., Mount Prospect, Ill., assignors to Continental Can Company, Inc., New York, N.Y., a corporation of New York
Filed May 7, 1964, Ser. No. 365,713
16 Claims. (Cl. 198—33)

This invention relates to article positioning and feeding apparatus and is more particularly concerned with improvements in apparatus for the feeding and positioning of closure caps of the kind utilized for the closing or sealing of packing vessels such as jars, bottles and the like.

Cap feeding and arranging or positioning devices have heretofore been developed for various purposes which are in the form of hoppers, chutes and the like, and these devices have included mechanism for automatically inverting those caps which are delivered from a hopper or other supply in upside down position so as to advance the caps through a guideway or chute leading to a sealing machine or the like so that successive caps are presented in a predetermined order for application to the jars or other vessels to be capped. Since automatic sealing or capping machines require that the caps be delivered at a rate determined by the capping machine the apparatus for supplying the caps must be capable of performance rates corresponding to or exceeding the performance rate of the capping machine and at the same time it must be operable to provide the caps only as fast as they are used. Also, the cap feeding apparatus must be capable of handling the caps at the required speed without deforming or otherwise damaging caps passing through the apparatus when there is any malfunctioning of the capping machine or the like which interrupts the capping operation and stops the flow of caps through the apparatus.

It is a general object of the present invention to provide an improved cap feeding and orienting apparatus which is positive and dependable in operation, which is of simple construction, which requires a minimum of attention to keep it in operation, and which will not result in damage to the caps when the flow of caps is interrupted.

It is a more specific object of the invention to provide an improved hopper and associated cap orienting and discharge apparatus which will deliver caps to an automatic sealing machine in proper position for application to the jars or the like which are to be sealed at a rate determined by the rapidity with which they can be accepted by the sealing machine and without subjecting the caps to scraping and scratching which will mar the coating and/or decoration on them.

It is a still further object of the invention to provide an improved cap feeding and orienting mechanism which comprises a hopper for receiving a supply of the caps in miscellaneous array and having means for delivering the caps in a continuous stream into a discharge chute, which chute has associated with it a rotary orienting device, the latter having means for sensing the attitude of each cap and revolving upside down caps into the proper arrangement for use, and the chute having means for neutralizing excess pressure in the line of caps when there is a lag at the cap pick-up and for allowing the turnover device to act freely without binding or locking so as to avoid distortion or bending of the caps.

It is another object of the invention to provide a cap handling apparatus which includes a hopper having a rotating disc with associated devices for receiving the caps in random arrangement and re-arranging them while delivering them to a pick-up area where they are deposited in a single line at the top of a chute leading to a rotary cap turnover device and the chute having a spring pressed pivoted wall which will move sufficiently to relieve the pressure in the line of caps when the turnover device is filled so that it will not advance the caps from the chute until it is free to discharge the caps passing therethrough and the turnover device having mechanism which will sense the position of each cap and revolve upside down caps so as to deliver all of the caps in a single line and right side up for application to the jars in a capping machine.

It is another object of the invention to provide in a cap feeding and orienting apparatus a hopper which receives a supply of the caps in random arrangement, a disc mounted within the hopper for rotation in an inclined plane and having a plurality of magnets spaced about the periphery thereof, and co-operating guide means for causing the caps to be arranged in a single plane on the disc in the lowermost side of the hopper where they are picked up by the magnets for delivery in a single line and in a constant stream to a tangential chute at the uppermost side of the hopper.

It is a still further object of the invention to provide a combination cap feeding and orienting apparatus which includes a hopper for positioning caps for delivery in a single line, a rotary cap turnover device and a connecting chute between the hopper and the turnover device with a portion of the outer wall of the chute being mounted for limited outward movement under pressure of the caps so as to avoid damage to the caps when the rotary turnover is filled and will not receive further caps from the chute.

These and other objects and advantages of the invention will be apparent from a consideration of the apparatus which is shown by way of illustration in the accompanying drawings wherein:

FIGURE 3 is a view taken on the line 3—3 of FIGURE 2, with the top portion of the hopper removed;

FIGURE 4 is a cross section taken on the line 4—4 of FIGURE 3, to a larger scale;

FIGURE 5 is a partial plan view to an enlarged scale showing principally the cap chute;

FIGURE 6 is a partial side elevation taken on the line 6—6 of FIGURE 5;

FIGURE 7 is a partial plan view, to an enlarged scale, showing the cap turnover device particularly, and with portions broken away;

FIGURE 8 is a cross section taken on the line 8—8 of FIGURE 7, to an enlarged scale;

FIGURE 9 is a fragmentary cross section taken on the line 9—9 of FIGURE 7, to an enlarged scale;

FIGURE 10 is a cross section taken on the line 10—10 of FIGURE 7, to an enlarged scale;

FIGURE 11 is a cross section, like FIGURE 10, and shows an upside down cap being turned over;

FIGURE 12 is a cross section taken on the line 12—12 of FIGURE 7, to an enlarged scale;

FIGURE 13 is a fragmentary cross section taken on the line 13—13 of FIGURE 7, to a larger scale, and shows a right side up cap positioned aat the cap discharge station; and FIGURE 14 is a cross section, like FIGURE 13, having parts broken away, and shows an upside down cap positioned at the cap discharge station.

Figure 1:
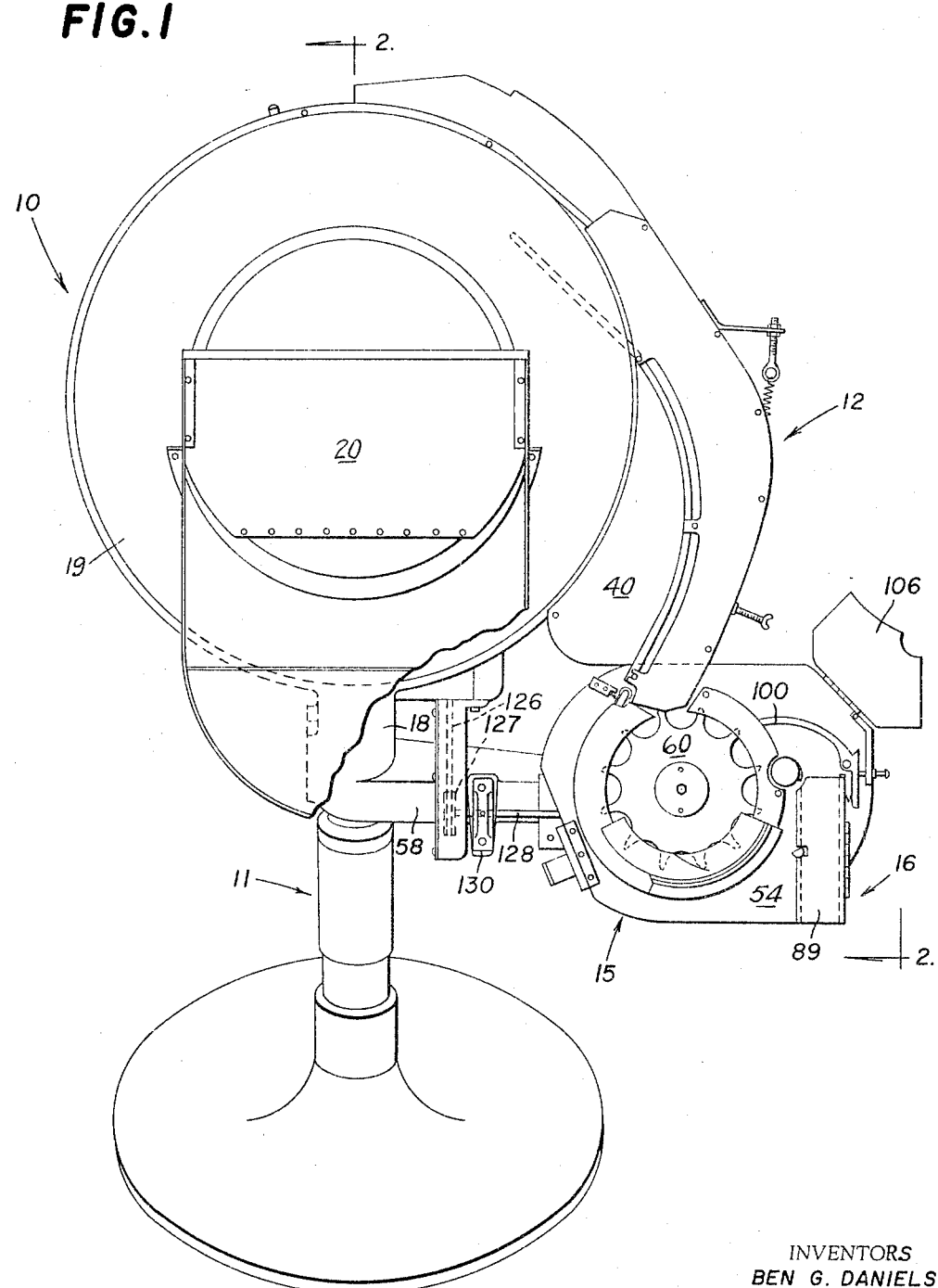
FIGURE 1 is a front elevation of a closure cap hopper and associated cap feeding and orienting mechanism.
Figure 2:
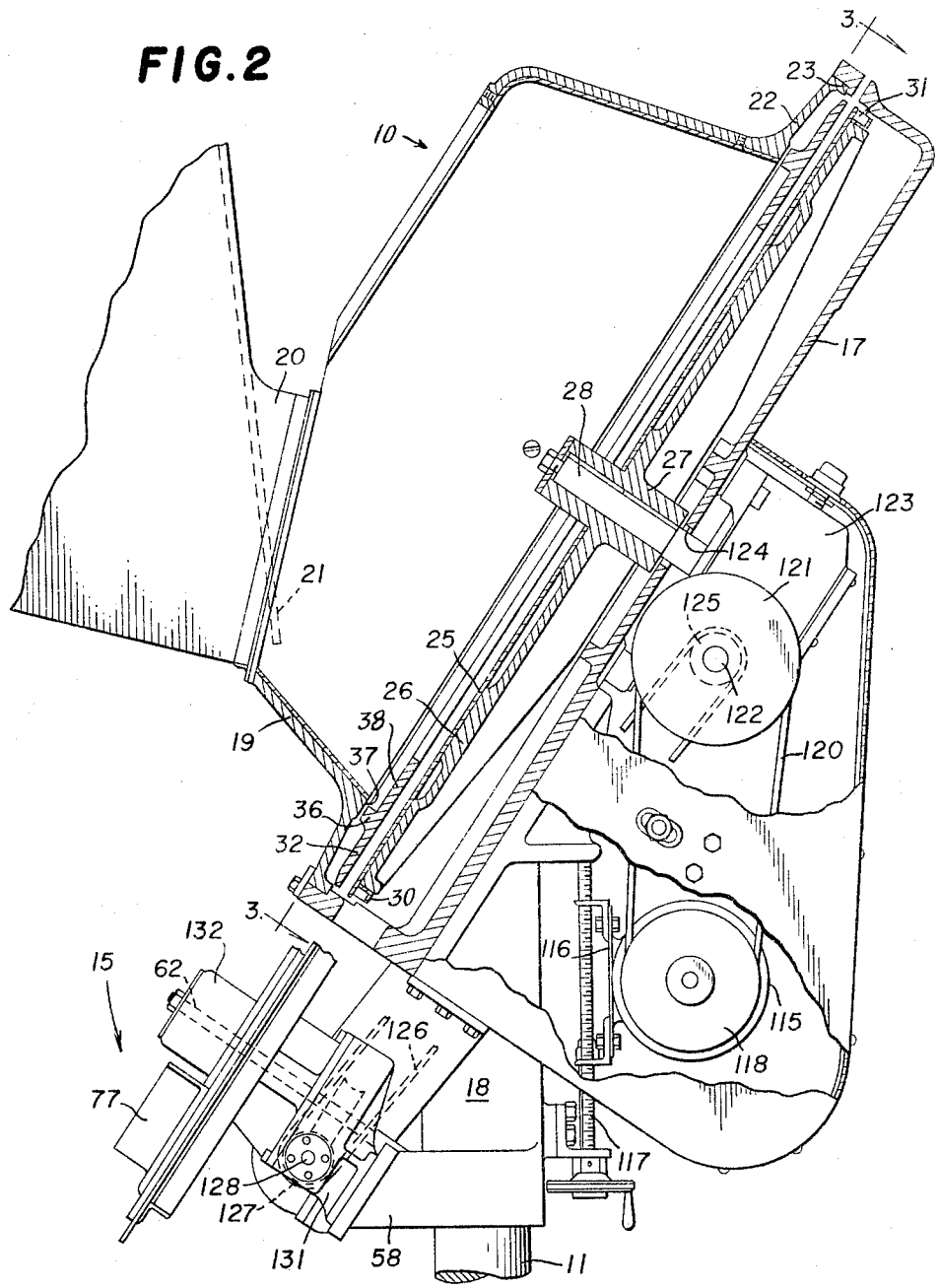
FIGURE 2 is a partial section and side elevation, taken on line 2—2 of FIGURE 1, to an enlarged scale.

Referring first to FIGURES 1 to 3, the apparatus illustrated comprises a hopper 10 which receives the caps in miscellaneous array. The hopper 10 is supported on an upright pedestal 11 so that it is disposed in an outwardly inclined plane. A curved chute assembly 12 is supported at a side of the hopper 10 which receives a line of caps from a discharge area near the top of the hopper and at the upper end of the chute. The chute 12 delivers the caps to a cap turnover device 15 disposed at the lower end of the chute 12 from which the caps pass to a small straight line discharge chute 16 and are delivered out of the apparatus to a capping machine or the like.

The hopper 10 which receives a supply of the caps in random position or miscellaneous array comprises an upwardly opening, cylindrical tray-like or bowl-shaped base 17 which is secured in fixed relation on the top of the upwardly extending post 18 at the upper end of the pedestal 11. The hopper base 17 is supported on the pedestal 11 so that it is in a plane inclined in the neighborhood of 60° relative to the horizontal. An inverted bowl-like cover 19 is fitted over the upwardly opening face of the base 17 so as to form an enclosure for receiving a supply of the caps from a funnel-like supply chute 20. The supply chute 20 is fastened onto the open front or top of the cover 19 so as to feed the caps into the hopper beneath a baffle plate 21, the latter restricting the flow of the caps somewhat. The cover 19 has a relatively narrow peripheral rim section 22 extending around its inner face with a flanged outer edge which seats in an internal peripheral recess 23 in the open face of the base member 17 and is removably retained by suitable fastening means.

A cap lifting disc 25 is mounted for rotation in the base 17 on a plate-like support 26 which has a hub 27 for mounting the same on a drive shaft 28, the latter extending normal to the plane of the base member 17. The disc support 26 is of somewhat smaller diameter than the circular disc 25 and carries on its outside periphery an outwardly opening ring 30 (FIGURES 2 and 4) which is of angular cross section and which forms a cage for a plurality of relatively small magnets 31. The magnets 31 are spaced about the periphery of the support 26 beneath the peripheral margin of the cap lifting disc 25. A circular guard plate 32 extends in spaced relation about the peripheral margin of the disc 25. The plate 32 is supported on three angular bracket arms 33 so that its lower face is in parallel, spaced relation with the top face of the disc 25, the space being slightly greater than the depth of the caps C (FIGURE 4) so that the caps may slide beneath the innermost edge of the plate 32 and arrange themselves in a single plane with the outermost line of caps as shown in FIGURES 3 and 4 being held on the disc 25 by the magnets 31 as the disc 25 revolves about the shaft 28 so that only a single line of the caps is carried to the upper portion of the path of the disc 25. A pair of bars 34 may be secured, if desired, on the top of the plate 32 by brackets 35 so as to extend to hub 27 and serve to agitate the caps. The guard plate 32 has an upstanding rib 36 on its top face which is positioned beneath the inner margin 37 of the rim portion 22 on the cover member 19 and closes off the space beneath the rim portion 22. The bracket arms 33 extend over the shelf 38 which is formed on the inner margin of the plate 32 by the rib 36 and serves to carry any of the caps which lodge on the shelf 38 upwardly towards the top of the path of the disc 25 where they fall off the shelf 38 and are returned to the bottom of the hopper. A single line of caps is held on the face of the disc 25 by the magnets 31 and carried to a discharge area 39 (FIGURE 3) at the top of the hopper. Here they are delivered to the discharge chute assembly 12 (FIGURES 5 and 6).

The discharge chute assembly 12 is mounted at one side of the hopper base 17. The assembly 12 comprises a base plate 40 which carries a curved inside rail 41 having an upper end extension 42 which projects into the path of the cap carrying margin of the disc 25 so as to wipe the line of caps held by the magnets 31 off of the disc 25 as they move into the discharge area 39. An upper outside guide rail 43 is pivotally mounted at 44 and has a curvature corresponding generally to the curvature of the inside rail 41 at its lower end so as to form with the inside rail a guideway for the caps which are advanced off the disc. 25. A lower outside guide rail assembly 45 of special construction is provided which comprises a rigid elongate bottom end section 46 and an upper section 47 of flexible material. The upper section 47 has its upper end connected to the lower end of a tension spring 48 which has its upper end anchored to an I bolt 49 with the I bolt forming an adjustable connection with an angular bracket 50 secured on the outside face of an edge forming bar 51 on the support plate 40. The lower end section 46 of the flexible rail assembly 45 is generally parallel with and spaced from the lower end section of the inner guide rail 41 so as to normally form a single line path for the caps C. The lower end of the rail section 46 carries an anchoring bolt 52 and a co-operating slot 53 is provided in the plate 54 forming the base of the cap turnover assembly 15, the latter having its top surface aligned with the top surface of the base plate 40. The bolt 52 and slot 53 adjustably position the rail section 46 the proper distance from the inside rail 41 for the caps being fed. A screw 55 is in threaded engagement in an aperture in an outside edge forming bar member 56 on the support plate 40 and has its inner end abutting the outer edge of the rail section 46 near the upper end thereof so that the width of the guideway below the screw 55 may be varied by adjusting screw 55 and bolt 52. A suitable cover plate 57 is provided which may be of transparent plastic or the like. The cover plate 57 is mounted so as to cover the space between the inside rail 41 and the outside edge forming members 51 and 56 on the support plate 40 leaving the guideway forming members 43 and 46 free to move relative to the inside members 41 and 42 between the cover plate 57 and the base plate 40. The chute assembly 12 extends to a rotary cap orienting or turnover apparatus 15 which is supported in the plane of the chute assembly 12 at the lower end of the base plate 40 of the latter.

The cap turnover apparatus 15 is carried on a bracket 58 (FIGURES 1 and 2) extending laterally of the pedestal member 18. The turnover device 15 comprises the base plate 54 and a plate-like turret or wheel 60 having peripheral pockets 61 for receiving the caps C from the chute assembly 12. The turret plate 60 is supported on a shaft 62 which extends normal to the base plate 54. The turret plate 60 is in the plane of the guideway formed between the rail 41 and the rail section 46 of the chute assembly 12. The cap receiving pockets 61 are formed with separating fingers 61′ which are curved to pick up the caps as they advance to the end of the chute assembly 12, the turret 60 being rotated in a counterclockwise direction, as indicated by the arrow in FIGURE 7.

A small roller 63 (FIGURES 7 and 9) is resiliently mounted adjacent the lower end of the rail 41 and is normally positioned for engagement with the edge or rim of each cap as it advances to pick-up position. The roller 63 is carried on the end of an arm 64 which is pivotally connected by pin 65 to the bifurcated end of a mounting plate 66 which is fixed on the base plate 54. The arm 64 carries a leaf spring 67 with the free end thereof engaging the fixed mounting plate 66. In addition, a compression spring 68 has one end seated on a pin 69 in the arm 64 and the other end seated in a socket forming aperture in a bracket 70 mounted on the base plate 54. The springs 67 and 68 urge the roller 63 in a direction to guide the lowermost cap in the chute into a pocket in the turret plate 60 and also to provide a resilient abutment if the turret pockets are full and advance of the lowermost cap in the chute is interrupted for any reason.

As the turret plate 60 revolves the caps C which may be either right side up or upside down as they emerge from the chute assembly 12 are carried beneath a guide or guard plate 71 (FIGURES 7 and 9) to a point where a pair of fixed magnets 72 and 73 (FIGURES 7 and 10) are mounted on the top of the plate 71 and beneath an aperture 74 in the base plate 54. The magnets 72 and 73 are disposed above and below the path of the caps in the pockets 61. The aperture 74 is in the form of a slot which constitutes part of a cap turnover or inverting trough. The magnets 72 and 73 are located at the entrance end of the inverting trough and determine which caps are to be advanced without turning and which are to be turned over. The top magnet 72 will hold a cap which is right side up so that it is advanced by turret 60 above the slot 74 while magnet 73 will tilt an inverted cap about the inside edge of slot 74 and start it through the inverting trough. The inverting trough is formed by a bottom member 75 secured beneath the plate 54 and a top member 76 secured on the top of the plate 54 above the marginal path of the turret plate 60 by means of the curved angle bracket 77. The top magnet 72 is mounted on the guard plate 71 which is bolted or otherwise secured to the base plate 54 together with an outside wall forming curved bar member 78 which defines the outside limit of the path traveled by the caps in the pockets 61. The magnet 72 will attract and hold substantially level in the pocket 61 a cap which has its top side uppermost, as shown in FIGURE 10, so that the cap in this condition will advance towards the discharge area without any change in its position. The lowermost magnet 73 is secured by means of a bracket 80 in the slot 79 in the bottom trough forming member 75 so that a cap which is moved by the turret 60 into position between the two magnets 72 and 73 with its top side down will be attracted by the magnet 73 and tilted into the turnover guideway or trough formed by the bottom and top trough members 75 and 76. The slot 74 in the plate 54 immediately narrows ahead of the magnets 72 and 73 so that a cap in its proper top side up position will be supported in the plane of the turret 60 as it advances beyond the magnets 72 and 73. An upside down cap which has been tilted by the lower magnet 73 into the guideway formed by the spiraled recesses or grooves in the members 75 and 76 will be turned through 180° by the turnover members 75 and 76. Turnover member 76 has a downwardly facing curved guideway 81 (FIGURE 8) with a spiral or taper of the proper degree to rotate the cap about a diameter thereof while it is advanced in the pocket 61, the cap turning on a pivot provided initially by the inside edge of the slot 74. The bottom trough forming member 75 has a groove 82 (FIGURES 10 and 11) with an upwardly tapered bottom wall which raises the cap as it approaches the exit end of the top trough forming member 76 so that the cap is rotated through 180° and inverted into the proper position with the top side up. The caps are advanced by the turret wheel 60 to a discharge area 83 where caps which are top side up are removed from the pockets 61 by a magnet 85 mounted in the hollow post 84 which is just outside the path of the peripheral edge of the turret plate 60 so that the cap approaching the post 84 in the pocket 61 is drawn towards the post 84 and out of the pocket 61 as the turret plate 60 advances past the post 84. The cap moves in a generally circular path around the post 84 and into a straight line chute 86 which is provided by an inner side wall forming member 87 extending from the post 84 and an oppositely disposed side wall forming member 88, both of the latter being mounted in parallel relation on the support plate 54 and having a cover plate 89 hingedly mounted at 90 and normally held in closed position by a latch 91.

The magnet 85 (FIGURES 7, 13 and 14) is mounted on a plate 92 in the bottom of the post 84 and the post wall opposite the turret plate 60 is recessed at 93 to accommodate the protruding marginal portion of the rim of a cap which is advanced to this point and is positioned with the top side uppermost. On the other side of the post 84 the plate 92 has a cam forming edge portion at 94 (FIGURE 7) which cams the cap outwardly away from the magnet 85 to reduce the pull on the cap and free it for discharge into the chute 86.

A magnet 95 (FIGURES 7, 13 and 14) is mounted beneath the base plate 54 on the end of a bar 96 which is slotted at 97 and secured to the plate 54 by bolt 98 so that the position of the magnet 95 can be adjusted relative to the path of the caps in the pockets 61. If an upside down cap is advanced past the magnets 72 and 73 to this point and is not turned over but is in an upside down position it will be attracted by the magnet 95 rather than the magnet 85 in the post 84, as shown in FIGURE 14, and will remain in the pocket 61 as it passes the post 84 so that it will be carried through the turnover apparatus a second time and the apparatus will have another opportunity to turn it over and bring it into proper position for discharge into the chute 86.

A curved bar 100 forming an outside wall or guard for caps passing around the post 85 and into the chute 86 is pivotally mounted at 101 and has a tail portion 102 which extends between the outer face of the outer guard rail 88 and an outer abutment bracket 103 at the edge of the base plate 54. A thumb screw 104 is adjustably mounted in the bracket 103 with its inner end forming a limit stop for the tail piece 102, which is urged in a counterclockwise direction by a compression spring 105 extending between the tail piece 102 and the outside rail 88 of the chute 86. The spring pressed outside rail 100 forms a safety guard permitting some pile-up of the caps at this point while limiting the same so that caps carried in the pockets 61 will be moved past the discharge area 83 and remain in the pockets 61 of the turret plate 60. A cover member 106 is provided for the area in which the bar 100 moves which is hingedly mounted at 107 to the side edge of the assembly. A top guard or guide plate 108 extends from the end of the top turnover member 76 to the edge of the cover member 57 on the chute assembly 12 above the discharge area 83 and outside wall forming rail members 110 and 111 space the same relative to the base plate 54 with the space between the rail members 110 and 111 forming part of the cap discharge area 83.

The entire apparatus is driven from a single motor 151 (FIGURE 2) which is mounted on a bracket 116 with a suitable height adjusting mehcanism 117 on the top of the post 18. The motor 115 has an output shaft with pulley 118 which is connected by a drive belt 120 with the pulley 121 on the input shaft 122 of gear box 123 from which the drive shaft 28 for the hopper extends through an aperture 124 in the hopper base member 17. The gear box shaft 122 carries a pulley 125 which is connected by a drive belt 126 with a pulley 127 on the drive shaft 128 for the turnover device 15. The shaft 128 is journaled at one end in a bearing bracket 130 mounted on the support bracket 58 and at the other end in a right angle gear box 131 beneath the base plate 54, which gear box is mounted on the end of support bracket 58. The shaft 62 on which the turret plate 60 is mounted extends from the gear box 131. A safety clutch 132 (FIGURE 8) is mounted on the top end of shaft 62 and connects the turret plate 60 to the shaft 62 so that the clutch will slip when there is excessive resistance to movement or stoppage of the turret plate 60 due to jamming of the caps or any other cause while the power remains on and the shaft 62 continues to rotate.

In the operation of the aparatus caps are fed in bulk to the hopper in random arrangement and as the disc 25 rotates the lowermost caps settle onto the top surface of the disc 25 and form a line around the margin of the disc beneath the guard plate or ring 32. The magnets 31 hold the outermost caps on the disc 25 as the latter rotates resulting in a line of the caps being moved to the upper portion of the hopper where they are wiped off the disc by the bar 42 and discharged into the chute assembly 12. The disc 25 is operated at a speed sufficient to deliver a continuous line of the caps in edge engagement to the assembly 12 with a certain amount of pressure being exerted on the caps in the line as they advance into the assembly 12. If there is any interruption or slowing down of the movement of the caps through the chute the pressure is relieved to some extent by outward movement of the pivoted outer wall member 43 and the flexible outer wall assembly 45, the latter acting to force the caps back into single line arrangement when the advance of the caps is resumed. The caps move through the assembly 12 and into the pockets 61 of the turret plate 60 of the turnover device 15. The magnets 72 and 73 sense the position of the caps and the inverted caps are drawn into the turnover trough and inverted. The caps which arrive opposite the magnet post 84 in proper top side up position are drawn out of the pockets by magnet 85 and discharged into the chute 86. Any cap which arrives at this point in inverted position is retained in the pocket 61 and again passed through the device. If there is any stoppage or slowing down of the caps in the discharge chute 86 the spring pressed bar 100 allows some pile-up of the caps in the discharge area 83 while allowing caps remaining in the pockets 61 of the turret plate 60 to pass without damage to any of the caps. When the turret plate pockets 61 are filled with caps due to stoppage of the flow of caps in the discharge area 83 the resiliently mounted roller 63 and the expansible outside wall assembly 45 in the chute 12 relieve the pressure in the line of caps in the chute 12 and prevent damage to the caps in the pockets 61 and at the bottom end of the chute 12. A safety gauge (not shown) may be employed in the discharge chute 86 to detect and stop the advance of the caps when an inverted cap advances through the turnover apparatus and enters the discharge chute 86 without being turned over. This may take the form of a chute section which is contoured to permit passage therethrough of the caps only when they are in proper top side up condition.

While particular materials and specific details of construction are referred to in describing the cap handling apparatus illustrated, it will be understood that other materials and equivalent structural details may be resorted to within the spirit of the invention.

We claim:

1. An apparatus for handling closure caps which comprises a hopper for receiving a supply of the caps in miscellaneous array, means in the hopper for arranging the caps in a single plane and for delivering the caps to a discharge area in a continuous stream, a cap chute having an upper end positioned to receive the continuous stream of caps from the cap delivering means and a lower cap discharge end for delivering the caps in a single line to a rotary cap orienting device, said chute having inner and outer side walls normally spaced to permit the caps to pass through the chute in a single line, said outer side wall having a pivotally mounted section with an outwardly flexible portion the upper end and resilient means normally holding said section spaced approximately the diameter of a cap from the inner side wall and permitting limited outward movement of said flexible portion under pressure of the caps when the flow of the caps is interrupted at the discharge end of the chute, and a cap orienting device at the cap discharge end of the chute which orienting device has a turret plate with peripheral pockets for receiving the caps from the chute, means co-operating with the turret plate for sensing the attitude of each cap and for revolving upside down caps while they are advancing in the pockets of the turret plate to a discharge station, means at said discharge station for removing successive caps from the pockets in the turret plate and means for rendering said cap removing means inoperative and for retaining the caps in the pockets of the turret plate when the flow of caps is blocked at said discharge station.

2. An apparatus as recited in claim 1, and means at the cap receiving end of said cap chute for directing the stream of caps into the receiving end of the cap chute.

3. An apparatus as recited in claim 1, and resiliently mounted means at the discharge end of said cap chute for engaging successive caps and guiding them into the turret pockets as they pass out of the cap chute.

4. A feeding and orienting apparatus for closure caps comprising a hopper for receiving the closure caps in random arrangement, means in the hopper for positioning the caps in a single plane and arranging the caps for delivery in a single line, a rotary cap orienting device, and a connecting chute between the hopper and the orienting device, said chute having an entry end positioned to receive the caps from the hopper and a discharge end for delivering the caps to the orienting device, said chute having oppositely disposed side walls spaced to provide a passageway for the caps, one of said side walls being fixed and the other side wall having a fixed section and a movably mounted section, the movably mounted section being pivoted at one end and having a flexible portion at the other end which will move outwardly under pressure of the caps whereby the caps are normally held in a single line for movement through the chute and limited movement of the caps out of said single line is permitted upon failure of the orienting device to accept caps from the chute.

5. A feeding and orienting apparatus for closure caps comprising a hopper for receiving the closure caps in random arrangement, means in the hopper for positioning the caps in a single plane and arranging the caps for delivery in a continuous stream, a cap orienting device and a connecting chute between the hopper and the orienting device, said chute having an entry end positioned to receive the caps from the hopper and a discharge end for delivering the caps to the orienting device, said chute having a fixed inner side wall and an oppositely disposed outer side wall with a fixed section and a movable section, said movable section being pivotally mounted at one end and connected at its other end to one end of a tension spring, the other end of the tension spring being anchored to a fixed portion of the chute so as to permit outward movement of said wall section under pressure of the caps whereby the caps are normally held in a single line for movement through the chute and limited lateral movement of the caps out of said single line is permitted upon failure of the orienting device to accept caps from the discharge end of the chute.

6. Apparatus for handling metal closure caps comprising a hopper having a circular plate in the bottom thereof which is rotatably mounted for movement in an inclined plane and having magnets spaced about the peripheral margin thereof for holding a line of caps on the uppermost face of the plate margin, means for rotating said plate so as to lift the caps to a discharge area adjacent the top of the plate, means forming an inclined chute which has its upper end arranged generally tangential to the hopper, means for directing the line of caps into the upper end of the chute, a cap orienting device at the bottom of the chute which receives the caps from the chute, said orienting device including a turret plate having peripherally spaced cap accommodating marginal pockets, means associated with the turret plate for sensing the position of the caps in the pockets and for inverting caps which are in upside down position, means forming a cap discharge passage adjacent the orienting device with an open upper end positioned to receive caps moved out of the pockets of the turret plate, and means for moving the same out of the turret pockets and into the open end of said passage, including a cylindrical post disposed adjacent the periphery of the turret plate and the open end of said passage and having a magnet mounted therein for attracting the caps and guiding them in a curved path into said passage.

7. Apparatus as recited in claim 6, and a pivotally mounted spring urged guide member co-operating with said post for normally defining a single line transfer passage for said caps and permitting a limited movement of the caps out of said line upon interruption of the flow of caps through said cap discharge passage.

8. Apparatus as recited in claim 6, and a curved outer guide rail member disposed in spaced relation to said post and forming therewith a curved transfer passage between the orienting device and the discharge passage, said guide rail member being pivotally mounted adjacent one end and spring urged toward a position where a single line of caps is accommodated between said guide rail and said post and said guide rail member having a limited outward movement to permit limited movement of the caps out of line due to pressure of the caps resulting from jamming or other stoppage of cap movement through ehe discharge passage.

9. An apparatus for feeding closure caps comprising a cylindrical hopper for receiving the caps in random arrangement, a cap lifting circular disc in the hopper which is mounted for rotation about an axis coinciding with the axis of the hopper and in a plane inclined to the horizontal, said disc having magnets spaced about its marginal edge for holding caps thereon in a single peripheral line and means for rotating the disc so as to advance a line of caps to an upper discharge area, means forming a cap chute having a cap receiving upper end communicating with said discharge area through an aperture in an upper side wall of the hopper, said cap chute being disposed in the plane of the cap lifting disc and having a cap discharge opening adjacent the bottom end, said cap chute having a fixed inner side wall forming a fixed guide for a line of caps, a pivotally mounted, spring pressed outer side wall which is normally spaced from the inner side wall to guide a single line of caps through the chute and which is movable outwardly a limited distance under pressure of the caps when the flow of caps out of the discharge opening is interrupted, a rotary cap turnover device mounted adjacent the lower end of the cap chute which turnover device comprises a rotatably mounted circular turret disposed in the plane of the cap lifting disc and having peripherally spaced, cap receiving pockets, guide means for holding the caps in the pockets in the turret so that they travel in a circular path, a pair of magnets spaced on opposite sides of the turret for sensing the position of the caps, means forming a cap revolving groove extending adjacent the periphery of said turret for co-operation therewith in turning caps which are attracted by one of the magnets to invert the same while they are advanced by the turret so that all the caps are delivered to a discharge station in the same position, means at the discharge station for removing caps from the turret pockets, and means for holding the caps in the turret pockets when movement of the caps from the discharge station is interrupted.

10. An apparatus for feeding closure caps comprising a cylindrical hopper for receiving the caps in random arrangement, a cap lifting disc in the hopper which is mounted for rotation about an axis coinciding with the axis of the hopper and in a plane inclined to the horizontal, said disc having magnets spaced about its marginal edge for holding caps thereon in a single peripheral line and for advancing the caps in edge-to-edge relation to a discharge area at the upper side of the hopper, the hopper having a discharge opening in the side wall at the discharge area, means forming a cap chute having a cap receiving upper end disposed in the plane of said cap lifting disc and communicating with said discharge area through said hopper discharge opening, said chute forming means having a discharge opening in its lower end, said chute having a fixed inner side wall providing a guide for a line of caps, an outer side wall having a pivotally mounted, spring pressed section which is disposed opposite and normally spaced from the inner side wall so as to pass a single line of caps therethrough, said wall section being movable outwardly a limited distance under pressure of the caps when the flow of caps out of the chute discharge opening is interrupted, a rotary cap turnover device mounted at the lower end of the cap chute which turnover device comprises a rotatably mounted circular turret plate having peripherally spaced, cap holding pockets, guide means for holding the caps in the pockets of the turret plate so that they travel in a circular path, a pair of magnets mounted on opposite sides of the turret plate for sensing the position of the caps, one of the magnets operating to hold in the turret pockets caps positioned with the top side up and the other magnet operating to pivot in the turret pockets caps positioned with the top side down, a cap turning slot extending adjacent the periphery of said turret plate for inverting caps which are pivoted in the pockets by said other magnet while they are advanced by the turret so that all the caps are delivered to a discharge station with the top side up, means at said discharge station for removing caps from the turret pockets, and means for holding the caps in the turret pockets when movement of the caps from the discharge station is stopped.

11. Apparatus for handling closure caps comprising a hopper having a plate in the bottom thereof which is mounted for rotation in an inclined plane and having means on the peripheral margin thereof for holding a line of caps on the uppermost face of the plate, means for rotating the plate so as to lift the caps to a discharge area adjacent the top of the plate, means forming a downwardly inclined chute with its upper end arranged generally tangential to the hopper, means for directing the line of caps into the upper end of the chute, a cap orienting device adjacent the bottom of the chute which receives the caps from the chute, said orienting device including means for sensing the position of the caps and for inverting caps which are positioned upside down, a discharge passage arranged adjacent the orienting device and having its upper end positioned to receive caps from the orienting device, and means for moving the caps from the orienting device into the discharge passage, said transfer chute providing a generally vertical, downwardly extending path for the caps which is defined by a fixed inner guide rail and a two section outer guide rail spaced from the inner guide rail, the one outer guide rail section being pivotally mounted at the upper end and urged by gravity toward the fixed inner guide rail the other outer guide rail section being pivoted at the lower end of the chute and connected at its upper end by a tension spring to a fixed portion of the chute so that it has a limited outward swinging movement under pressure exerted by excess caps in the chute due to interruption of the flow of caps out of the bottom of the chute.

12. Apparatus as recited in claim 11, and the outer guide rail section which is pivoted at the bottom of the chute having a flexible top portion which permits limited movement of the caps out of line in the central portion of the cap path and relieves some of the pressure exerted by incoming caps when the flow of caps out of the chute is interrupted.

13. An apparatus for feeding closure caps comprising a hopper for receiving the caps in random arrangement, a cap lifting disc in the hopper which is mounted for rotation in a plane inclined to the horizontal, said disc having means for holding caps thereon in a single peripheral line and for advancing the caps to an upper discharge area, a cap chute having a cap receiving upper end communicating with said discharge area, said chute being disposed in an inclined plane and having a lower discharge end, a rotary cap turnover device mounted at the lower end of the discharge chute which turnover device comprises a circular turret plate rotatably mounted in an inclined plane and having peripherally spaced, cap receiving pockets, guide means for holding the caps in the turret pockets so that they travel in a circular path, a pair of magnets spaced on opposite sides of the turret plate adjacent the cap entrance for sensing the position of the caps, a cap turning trough extending along the path of the caps in said turret plate for co-operation therewith in turning improperly positioned caps which are attracted by one of the magnets to invert the same, means to rotate said turret so as to advance the caps to a cap discharge area, means at the discharge area for removing caps from the turret plate, and means for holding an improperly positioned cap in the turret plate when there is a failure of the sensing and turning devices and the improperly positioned cap reaches the discharge station.

14. An apparatus as recited in claim 13, and said means for removing the caps from the turret plate comprising an upright cylindrical post disposed adjacent the edge of the turret plate at the discharge area and a magnet associated with said post for attracting the caps and causing them to move out of the turret and pivot around the base of said post.

15. An apparatus as recited in claim 14, and said cylindrical post having a recess at the base thereof on the side adjacent the turret plate for accommodating a projecting skirt portion of a cap which is right side up and a cam plate at the opposite side of the post for forcing the cap away from the post when it is moved around the same by pressure of oncoming caps.

16. An apparatus as recited in claim 15, and said means for holding an improperly positioned cap in the turret plate comprising a magnet mounted beneath the turret plate adjacent said post which is positioned relative to said post so that it will attract the improperly positioned cap and prevent it from being moved out of the turret and around said post.

References Cited by the Examiner

UNITED STATES PATENTS

| | | | |
|---|---|---|---|
| 1,387,055 | 8/1921 | Kaase | 221—243 |
| 2,440,959 | 5/1948 | Krueger | 221—173 |
| 2,745,537 | 5/1956 | Cadman. | |
| 2,815,148 | 12/1957 | Day | 198—30 X |
| 2,836,947 | 6/1958 | Day | 198—30 X |
| 3,065,841 | 11/1962 | Stover. | |

EVON C. BLUNK, *Primary Examiner.*

EDWARD A. SROKA, *Examiner.*